Dec. 21, 1948.    L. BÉCHEREAU    2,456,906
SUPPORTING SURFACES FOR AIRCRAFT
Filed Dec. 16, 1939    4 Sheets-Sheet 1
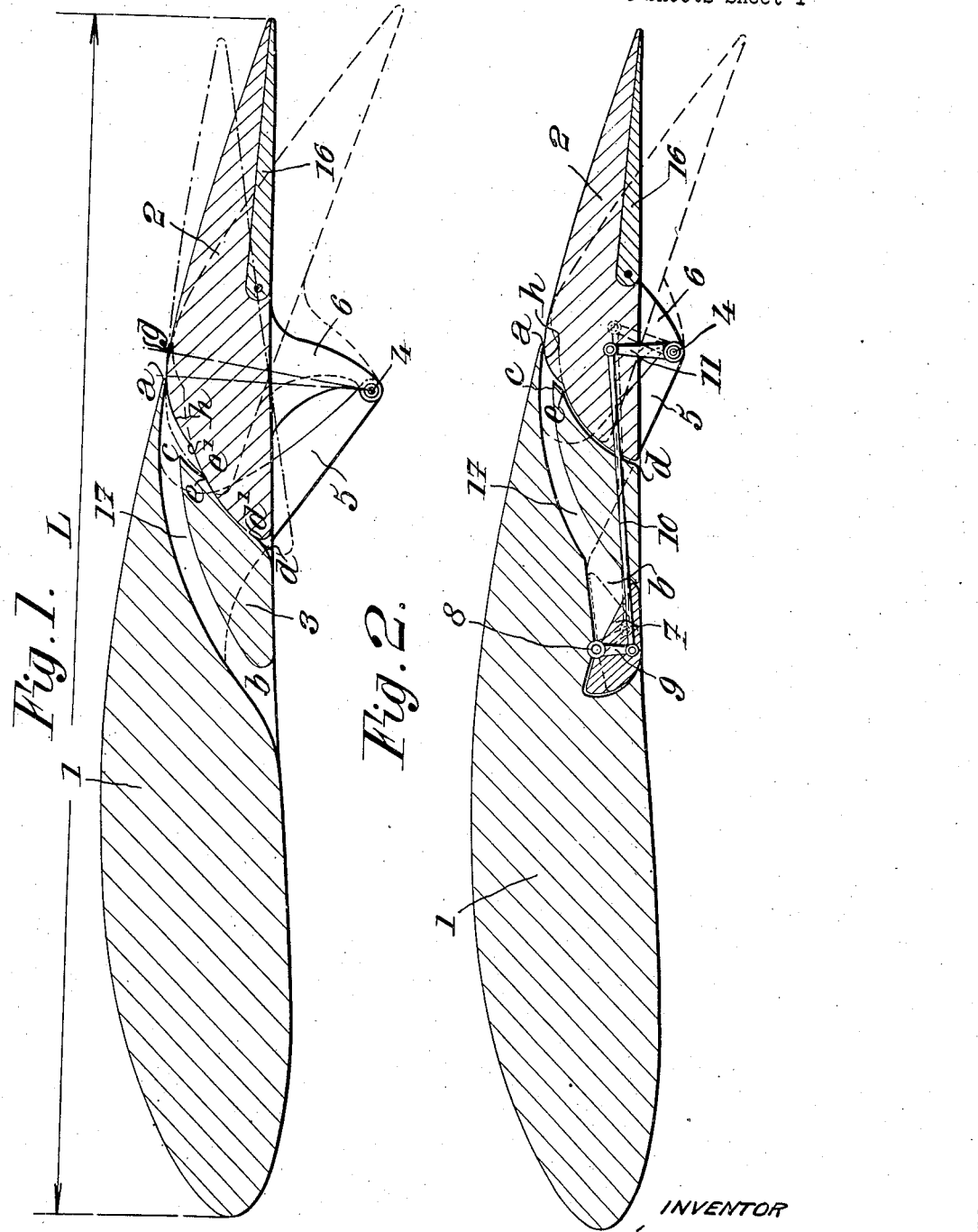
INVENTOR
LOUIS BÉCHEREAU,
BY
ATTORNEYS Dec. 21, 1948.   L. BÉCHEREAU   2,456,906
SUPPORTING SURFACES FOR AIRCRAFT
Filed Dec. 16, 1939   4 Sheets-Sheet 2

INVENTOR
LOUIS BECHEREAU,
BY
ATTORNEYS

Dec. 21, 1948.   L. BÉCHEREAU   2,456,906
SUPPORTING SURFACES FOR AIRCRAFT
Filed Dec. 16, 1939   4 Sheets-Sheet 3
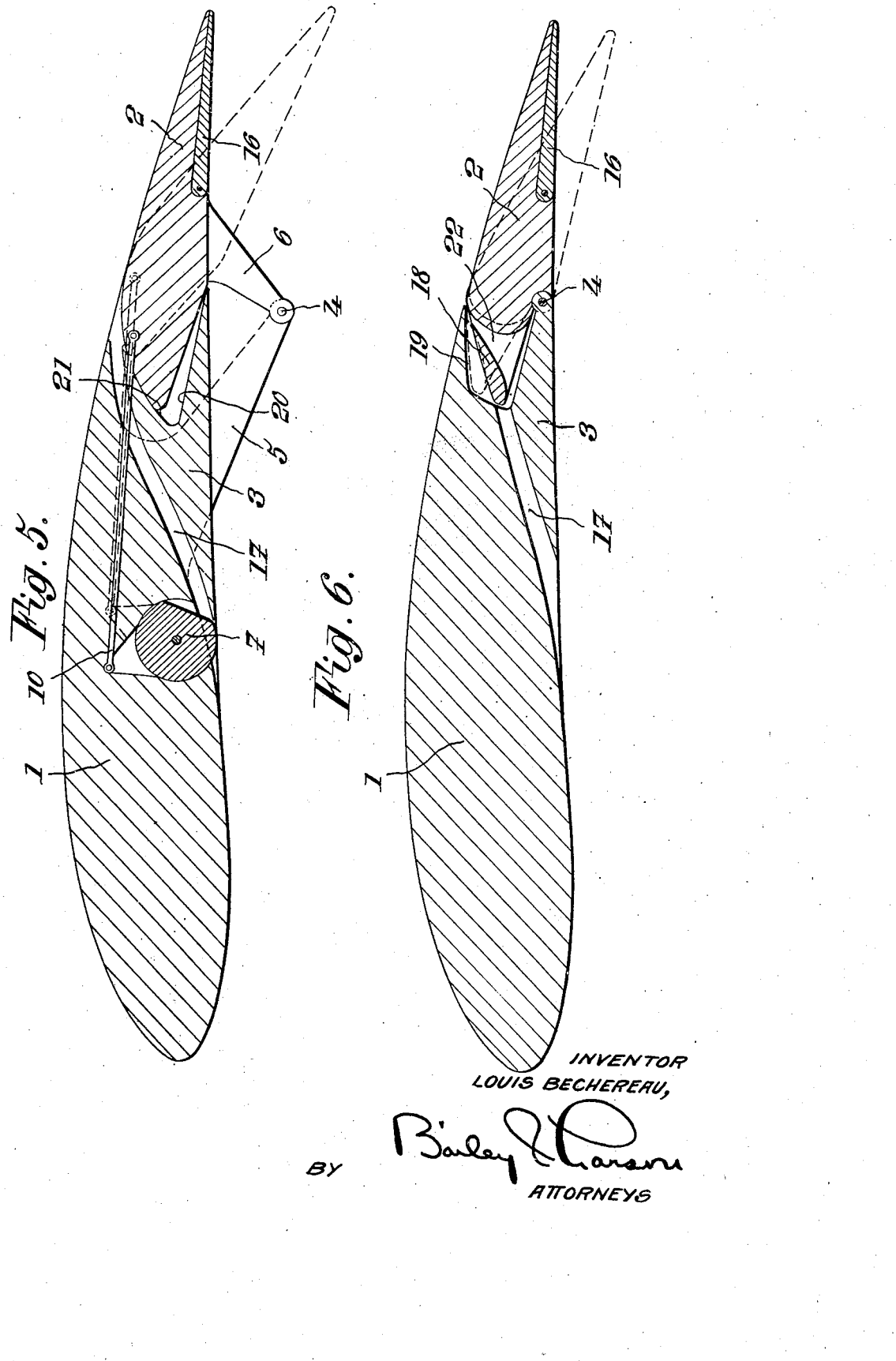
INVENTOR
LOUIS BECHEREAU,
BY
ATTORNEYS

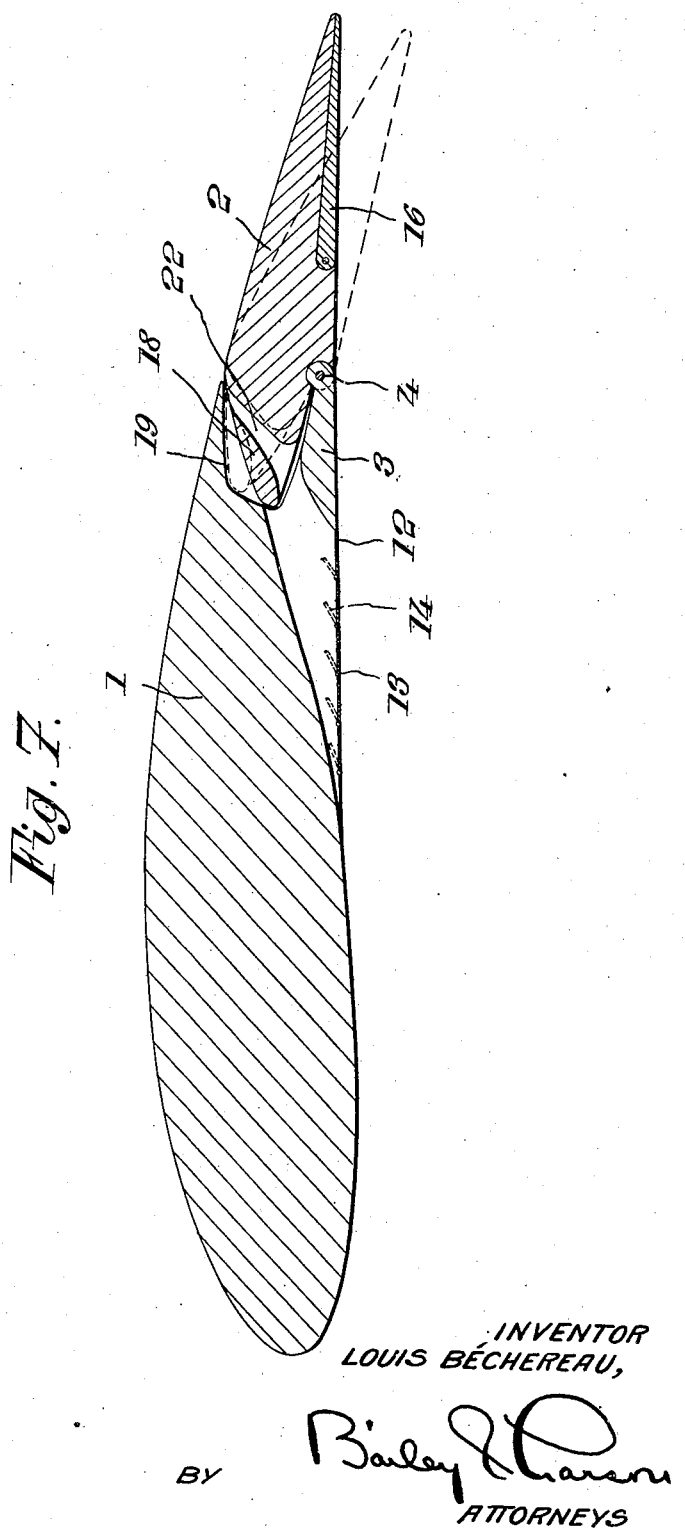

Patented Dec. 21, 1948

2,456,906

UNITED STATES PATENT OFFICE 2,456,906

SUPPORTING SURFACES FOR AIRCRAFT

Louis Béchereau, Paris, France; vested in the Attorney General of the United States Application December 16, 1939, Serial No. 309,655
In Luxemburg December 19, 1938

6 Claims. (Cl. 244—42)

This invention relates to improvements in variable supporting surfaces for aircraft, and in particular such supporting surfaces involving at least two elementary wings or wing sections conjugated together so as to form a main wing, the sections being adjustable relative to each other to vary the wing surface and provide a slot effect so as to increase the lifting power and/or the lateral stability of the wing.

The primary object of the invention is to provide an improved construction of sectional wing of the character indicated above, wherein substantially increased lifting effect, with a high lift to drag ratio, is obtained with a minimum of disturbance from the slot-effect, and with balanced aerodynamic effects on the wing sections.

Another important object of this invention is to provide in a structure of the character indicated, at least one slot forming a fixed passage, preferably as oblique as feasible with respect to the chord of the wing section, and arranged relative to the sections constituting the supporting surface so that the pivoting of the sections controls the flow of air through the passage.

Another important object of this invention is to provide wing structure of the character indicated above in which the pivotal axis of the movable section or sections is placed as close as feasible to the upper side of the supporting surface, substantially at said upper side, or in the main wing section, in such a way as to provide for the desired flow of air through the slot or slots when the wing sections are pivoted relative to each other.

Another important object of this invention is to provide in a construction of the character indicated above, shutter means at the end of the slot which corresponds to the wing underside or the wing upperside, so arranged as to restore the continuity of the fore and aft wing sections when the wing sections are restored to normal flying condition from a pivoted lift-increasing condition with the slot open, the shutter means preferably being operated by and with the pivoting of the sections.

Other important objects and advantages of this invention will be apparent from the following description and the appended drawings, wherein for illustration only, preferred embodiments of this invention are set forth.

In the drawings:

Figure 1 is a transverse sectional view taken through a sectional wing structure according to the present invention, in which the rear section, in the form of an aileron, constitutes the wing curvature modifying element.

Figure 2 is a similar view taken through another embodiment of this invention.

Figures 3, 4, 5, 6 and 7 are similar views taken through further embodiments of the present invention.

Figure 3:
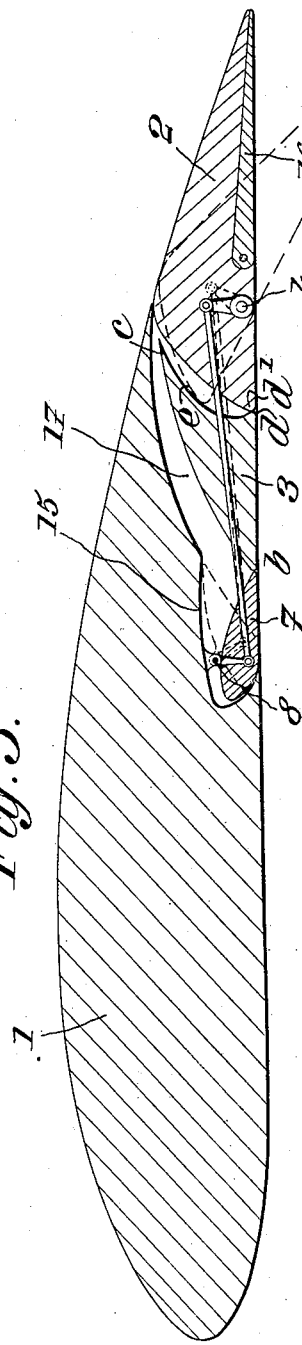
Figure 4:
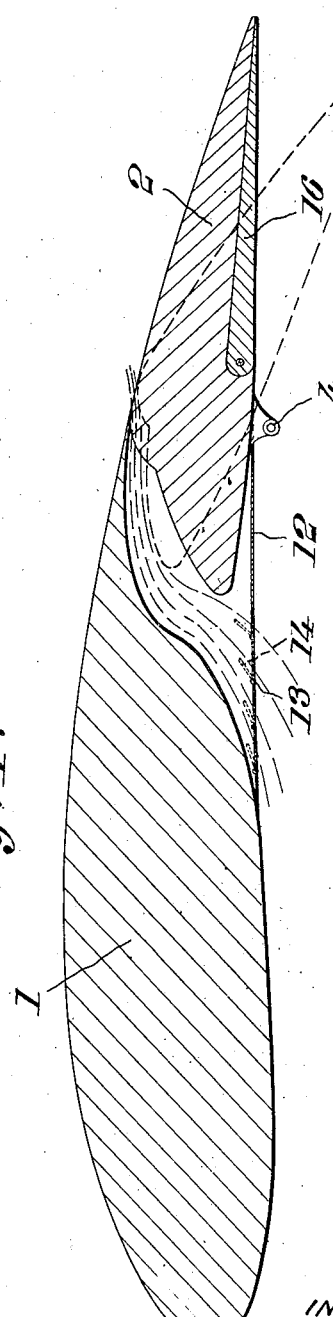

Referring in detail to the drawings, the variable wing structures according to the present invention are composed, along at least some portion or portions thereof, of at least two wing sections 1 and 2, adapted to be pivoted relative to each other to increase the lift of the wing structure by slot effect, and in which the rear section can act as an aileron.

I have found it advantageous to employ a wing having relatively great thickness, at least at the middle or center portion thereof, for instance, a section of 25% relative thickness, compared with the length "L" of the wing.

The wing sections 1 and 2 are arranged so that under normal flying conditions they join at the upper side of the wing at a, at about two-thirds of the length of the chord from the leading edge of the wing. However, it will be understood that this condition is not a necessary one.

The means for controlling the relative pivoting of the sections 1 and 2, and for mounting the front section or sections 1 are fixed to the body or fuselage of the aircraft, while the rear sections 2, constituted for instance by two elements located on either side of the fuselage, are movably mounted by suitable means providing the following conditions:

(a) Simultaneous downward deflection of the rear sections 2 for increasing the lift of the wing, or, (b) Pivoting of the rear sections 2 in opposite directions from an intermediate position for producing lateral control of the aircraft.

It will be understood that the intermediate position of the rear wing sections corresponds to normal flight, from which position the rear wing sections may be pivoted either upwardly or downwardly.

Heretofore, for obtaining wing slot effect, the slot has been placed directly between the front and rear wing sections. This failed to provide against throttling of the flow of air through the slot and other undesirable conditions, produced when the nose or leading edge of the rear wing section was displaced by the pivoting of the rear wing section.

In accordance with the present invention the means for obtaining the slot effect are devised to comply with the following conditions:

(a) That there be provided at least one slot, in the form of a passage of fixed cross section, that is, of a cross section uninfluenced by the relative pivoting of the wing sections, for at least part of its length. The passage is of any suitable inclination, but preferably of as great inclination as possible with respect to the chord of the sections of the main wing, with the inlet of the slot on the underside of the wing as close as possible to the first third from the front of the fore and aft section of the main wing, or preferably within this first third.

(b) That the cross section of the flow of air at the outlet, and of the inlet of the slot be adjustable in accordance with the pivoting of the corresponding movable wing section 2.

For attaining these conditions, the wing slot 17 is arranged between the front section 1 and an intermediate element 3, which is preferably fixed in position and arranged and combined in any suitable manner with respect to the rear wing section 2 so that the element 3 abuts in a substantially fluid tight manner against the rear section 2, during at least a part of the pivotal range of the rear section 2. However, the invention also contemplates arrangements in which a portion of the air could pass between element 3 and rear section 2.

At the underside of the front wing section 1, the element 3 is provided as in Figures 1 to 3 and 5 to 7, with a covered surface arranged in such relation to the opposed covered surface of the said front section, as to define a passage $b$, $c$, of fixed or of variable cross section along its length. Preferably, the covered surface of element 3 and the related covered surface on the front wing section 1 are substantially inclined with respect to the chord of the main wing structure.

On its side facing the rear wing section 2, the cross sectional shape of the element 3 presents rear surface depending upon the relative rotation of the front and rear wing sections 1 and 2. If this rotation takes place about an axis 4, (Fig. 1) the said rear surfaces will be circular, as at $de$, with the center thereof on the axis 4, so that the forward part $d^1 e^1$ of the upper side of rear wing section 2 can, in the course of rotation, slide along the surface $de$.

This sliding displacement can take place either between the surfaces $de$ and $d^1 e^1$ as stated above (see Figure 1) or between the surface $de$ and the nose $d^1$ on the forward extremity of the section 2, as shown in Figure 3.

It will be understood that any other arrangement within the scope of the invention may be employed. For example, as shown in Figures 6 and 7 of the drawings, the intermediate element 3 may merely include a bearing surface upon which the underside of the movable rear wing section 2 comes to rest in its undeflected position. It is feasible, as shown in Figure 5, to combine the arrangements shown in Figures 5 and 6.

The provision of an intermediate element 3 facilitates the adaption of another feature of this invention, which consists in positioning the pivotal axis 4 of the rear wing section as close as possible to the underside of the main or forward wing section 1, or even at the level of this underside or on the inside of the main wing section. The advantage of such feature is that it reduces the projection below the wing of parts, such as the arms 5 and 6, for connecting together the wing sections 1 and 2 (see Figures 1, 2 and 5) or eliminates these projecting parts, as seen in Figures 3, 4, 6 and 7 of the drawings.

When arms 5 and 6 are used with a pivotal axis 4 on the outside, it is feasible to arrange that the arms 5 do not extend through the rear wing section 2, as shown in Figure 5.

Any of the above described arrangements is completed by the provision of means for regulating or controlling the flow of air through the slot 3, in accordance with the relative pivoting of the front and rear wing sections 1 and 2. Such means may act either at the outlet of the wing, as shown in the slot on the upper side of the wing, as shown in Figures 1 and 6, or at the inlet of the slot 3 on the underside of the wing, as shown in Figure 5, or both at the outlet and inlet of the slot, as shown in Figures 2, 3 and 7.

Assuming that the control of air flow is to be established at the outlet of the slot at $a$, as in Figure 1, it is sufficient to provide means for forming a suitable notch or recess between the proturberance $h$ on upper side of rear wing section 2 and the nose $ce$ of element 3, the notch or recess being such that when the rear wing section 2 is pivoted downwardly in order to increase the wing's lift effect, as shown in dotted lines in Figure 1, the cross section of air flowing between the trailing edge $a$ of the front wing section 1 and the proturberance $h$ tends to increase.

On the other hand, where lateral control of the aircraft is contemplated, it is advantageous to have a fluid tight connection at $a$, at least when the rear wing section 2 is pivoted upwardly. In Figure 1, the proturberance $h$ on the upper side of rear section 2 is given a circular shape extending to the left from point $g$ and having its center at 4, thereby assuring fluid tight contact between the components in normal flight conditions, as shown in Figure 1, and in all intermediate positions up to the limit of upward deflection provided for the rear wing section 2, as shown in dotted lines in Figure 1.

Where it is desired to control the flow of air through the slot at the inlet thereof at $b$, suitable means may take the form of a flap 7, shown in Figures 2, 3 and 5, whose position will be controlled in accordance with the angular displacement of the rear wing section 2, by means of suitable connecting means such as those indicated by the numerals 9, 10 and 11, connected between said flap 7 and the section 2.

The functions of the flaps 7 under normal flying conditions include complete restoration of the continuity of the undersurface of the entire wing structure, and the same arrangement may be made at $a$ at the outlet of the slot, with respect to the upper surface of the wing structure.

In another embodiment of the invention I provide, in the cover surface at the inlet of the slot, orifices 13 fitted with valves 14 arranged to open automatically when the sections are deflected with respect to each other for increased lift effect by the action of suction existing at the point $a$ and hence in the slot. Such an arrangement makes possible the elimination of the intermediate element 3 (Figure 4) and is of general application to wing structures.

The wing structures described hereinabove may also include means for balancing the aerodynamic reactions with respect to the axis 4, with the advantages of increased aerodynamic effectiveness wherein the lift-to-drag ratio is high under flying conditions and the lift is great when flying with the lift increasing means in operative position and simplicity and strength of parts. The lift effect can be still further increased by making use of upper side flaps 16 carried by the rear wing section 2.

The invention further contemplates the combining with the movable wing sections of means arranged to coact with the wing slot for balancing, at least partially, the aerodynamic effects which tend to produce torques opposing the relative rotation of the wing sections. Such balancing means is especially effective when the axis 4 is located close to the underside of the wing, and forward of the center of thrust of the related rear movable wing section 2, so that a couple is produced which opposes rotation of the wing sections.

In providing such balancing means it is usually sufficient to expose to the aerodynamic forces acting on the slot, suitable surfaces which are conjugated in a suitable manner to the rear wing sections 2. Where flaps or the like 7 (see Figures 2 and 3) are used for the purpose, it is advantageous to utilize the torque resulting from the action of suction on the flaps with respect to the axis 8, for counterbalancing the torque resulting from the aerodynamic forces and other forces acting upon the rear wing section 2.

The axis may be located eccentrically with respect to the center of thrust of the flap, so as to increase the balancing torque. A recess 15 can be provided in the wing for housing the flap.

In another embodiment of this invention, shown in Figures 6 and 7, I combine the compensating surfaces in the rear movable wing sections 2 themselves, namely, a flap 18 at its forward part from which the section is separated by a slot 22 arranged so as to prolong the passage 17 when the section is pivoted to lift increasing position.

It will be understood that with this arrangement the action of the air passing through the slot produces a force which exerts, with respect to the axis 4, a torque opposed to that produced by the action of the aerodynamic forces upon the underside of the rear wing section 2 when the wing section is in a pivoted position. A complementary compensating force can also be produced by the action of suction, produced in the recess 19 provided in the wing above the flap 18, and acting upon the upper side of the flap. The flap can be mounted on the rear wing section 2 in any suitable manner.

While I have set forth and described herein in detail some preferred embodiments of my invention, it is to be understood that I do not limit the application of my invention thereto, but changes may be made in the construction and arrangement of the component parts without departure from the scope of the invention and the subjoined claims.

What I claim is:

1. In a wing structure characterized by a relatively stationary main wing portion and a pivotable wing portion; a fixed air passage provided by a slot formed through said main wing portion, said slot inclining rearwardly from the undersurface of said main wing portion and terminating through the trailing edge surface of said main wing portion, said trailing edge surface being concave, and said leading edge of the pivotable wing portion being formed with mating parts convexed to conformably engage with concave parts of the trailing edge of said main wing portion and located above and below the rearward opening of said passage in a manner to substantially close said rearward opening of the passage while the pivotable wing portion is in coplanar relation to the main wing portion, and pivot means mounting said pivotable wing portion on said main wing portion in a manner enabling said pivotable wing portion to be swung away from said coplanar relation to a position wherein said mating parts are dislocated with respect to each other and the rearward opening of said passage is open for the passage of air rearwardly over said pivotable wing portion.

2. A wing structure comprising a main relatively stationary wing segment and a pivotable wing segment pivotally mounted at the trailing edge of the main segment and normally coplanar therewith, the trailing edge of the main wing segment and the leading edge of the pivotable wing segment being formed with conformably curved surfaces concentric with the pivotal axis of the pivotable segment, said cooperating surfaces being in nested substantial coextensive relation when the pivotable segment is in coplanar position, said main wing segment being provided with a fixed rearwardly inclined slot defining an air passage leading from the undersurface of the main wing segment and discharging through an opening formed in the trailing edge of the main wing segment at a point intermediate the upper and lower extremities of the said cooperating curved surfaces on said trailing edge, whereby said opening is closed when the pivotable wing segment is in its coplanar position and open when said pivotable wing segment is pivoted to another position.

3. A wing structure comprising a main relatively stationary wing segment and a pivotable wing segment mounted behind the main wing segment, the two segments being normally coplanar, the trailing edge of said main segment being forwardly concaved between its upper and lower extremities and said main segment being provided with a slot having its forward air inlet end located at the undersurface of said main wing segment and its rearward air outlet end opening through the upper part of the concaved part of the trailing edge of the main wing segment and facing downwardly and rearwardly, said pivotable wing segment having a convex leading edge part to mate with a portion of the concaved part on the trailing edge of said main wing segment while the segments are in coplanar relation, in a manner to preclude the passage of air between them while the segments are in said coplanar relation, a convex protuberance formed on the upper part of the leading edge of said pivotable wing segment for meeting with the upper part of the concaved part of the main wing segment at a point above the outlet end of said slot in the coplanar relation of the segments so as to close off the outlet end of said slot, said protuberance being arranged to become spaced from said concaved part when said pivotable wing segment is pivoted away from the coplanar relation in a manner to open the outlet end of said slot, and means pivotally mounting said pivotable wing segment on said main wing segment.

4. A wing structure, according to claim 3, wherein said main wing segment includes a flap pivoted thereon for movement into and out of blocking relation to the inlet end of said slot, and means coordinating the action of said pivotable wing segment and of said flap whereby said flap is in the closed position while said pivotable segment is in its normal coplanar position and said flap is in an open position while said pivotable segment is in a displaced position.

5. A wing structure, according to claim 3, wherein said concaved part of the trailing edge of the main wing segment is forwardly indented below the outlet opening of the slot to define a relatively deep recess, and wherein said leading edge of the pivotable wing segment has a portion extending forwardly to project into said recess in both the coplanar and pivoted positions of the pivotable wing segment, for engagement with at least one of the walls of the recess.

6. A wing structure, according to claim 3, wherein said concaved part of the trailing edge of the main wing segment is forwardly indented to define a relatively deep recess extending above and below the outlet opening of the slot, and wherein said leading edge of the pivotable wing segment has a portion extending forwardly to project into said recess in both coplanar and pivoted positions of the pivotable wing segment, for engagement with at least one of the walls of the recess, said forwardly extending portion comprising a flap positioned to affect the course of air emerging from said outlet opening, the relation of said flap to said outlet opening being determined by the pivoted position of said pivotable wing segment.

LOUIS BÉCHEREAU.

REFERENCES CITED

The following references are of record in the file of this patent:

UNITED STATES PATENTS

| Number | Name | Date |
|---|---|---|
| 1,422,614 | Page | July 11, 1922 |
| 1,422,615 | Page | July 11, 1922 |
| 1,422,616 | Page | July 11, 1922 |
| 1,456,643 | Maxwell, Jr. | May 29, 1923 |
| 1,723,778 | Hall | Aug. 6, 1929 |
| 1,726,118 | Page | Aug. 27, 1929 |
| 1,770,575 | Ksoll | July 15, 1930 |
| 1,777,593 | Upson | Oct. 7, 1930 |
| 1,785,620 | Frise | Dec. 16, 1930 |
| 1,793,702 | Ksoll | Feb. 24, 1931 |
| 1,800,746 | Page | Apr. 14, 1931 |
| 1,818,321 | Hall | Aug. 11, 1931 |
| 1,874,278 | Gaines | Aug. 30, 1932 |
| 2,034,218 | Weick et al. | Mar. 17, 1936 |
| 2,036,891 | Sline | Apr. 7, 1936 |
| 2,039,179 | Mazinni | Apr. 28, 1936 |
| 2,117,607 | Griswold, 2d | May 17, 1938 |
| 2,120,568 | Nazir | June 14, 1938 |
| 2,169,416 | Griswold, 2d | Aug. 15, 1939 |
| 2,177,798 | Bechereau | Oct. 31, 1939 |